United States Patent

[11] 3,620,705

| | | |
|---|---|---|
| [72] | Inventor | Stuart M. Dockerty<br>Corning, N.Y. |
| [21] | Appl No | 752,883 |
| [22] | Filed | Aug. 15, 1968 |
| [45] | Patented | Nov. 16, 1971 |
| [73] | Assignee | Corning Glass Works<br>Corning, N.Y. |

[54] METHOD AND APPARATUS FOR FEEDING MOLTEN GLASS
7 Claims, 7 Drawing Figs.

[52] U.S. Cl. ................................................. 65/129,
65/330
[51] Int. Cl. .................................................. C03b 5/26
[50] Field of Search........................................ 65/126,
129, 164, 330, 325

[56] References Cited
UNITED STATES PATENTS

| 1,828,726 | 10/1931 | Lorenz | 65/129 |
| 3,351,449 | 11/1967 | Ambrogi | 65/129 X |

*Primary Examiner*—S Leon Bashore
*Assistant Examiner*—Saul R Friedman
*Attorneys*—Clarence R Patty Jr and Burton R Turner

ABSTRACT: A system for accurately controlling the periodic charging of low-viscosity glass downwardly through an orifice while maintaining zero flow at the orifice intermediate the charging cycles. A needle member is positioned with a tubular well extending below the glass level of a feeder. A parabolic cam surface imparts vertical movement to the needle through a cam follower to alternately feed a desired charge volume from an orifice in the lower end of the well and maintain zero flow between charges. A defined portion of the parabolic cam surface is presented to the cam follower to vary the volume of the charge while maintaining constant cycle time. This is accomplished by a pivotal arm which is provided with a roller follower at its end which follows a constant velocity rotating cam. A rack is connected to the other end of the arm and the rack engages a pinion. The parabolic cam surface rotates in response to the pinion.

PATENTED NOV 16 1971 3,620,705
SHEET 1 OF 2
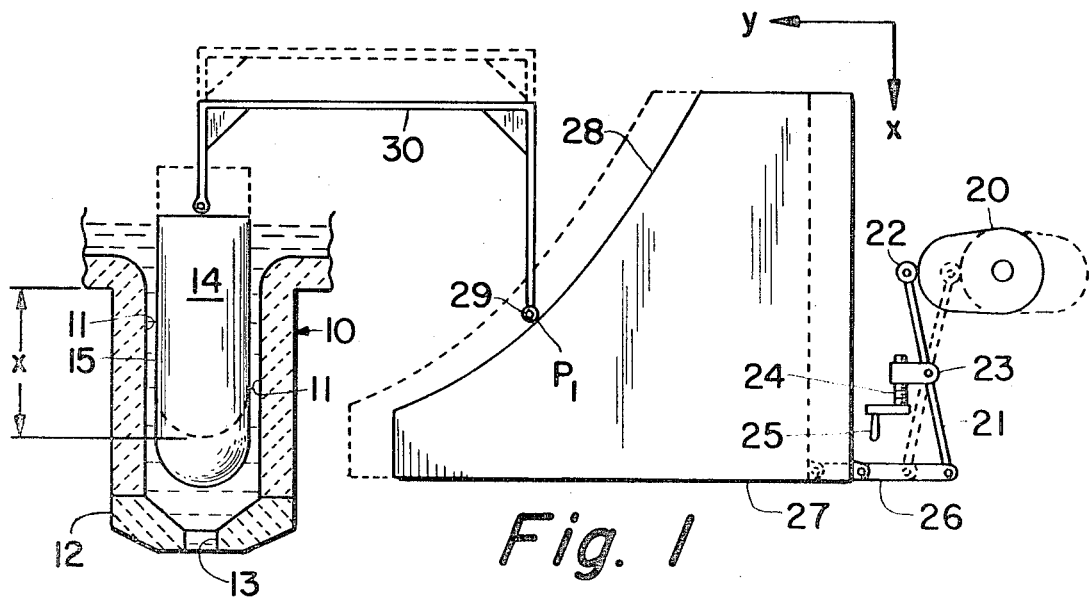
Fig. 1
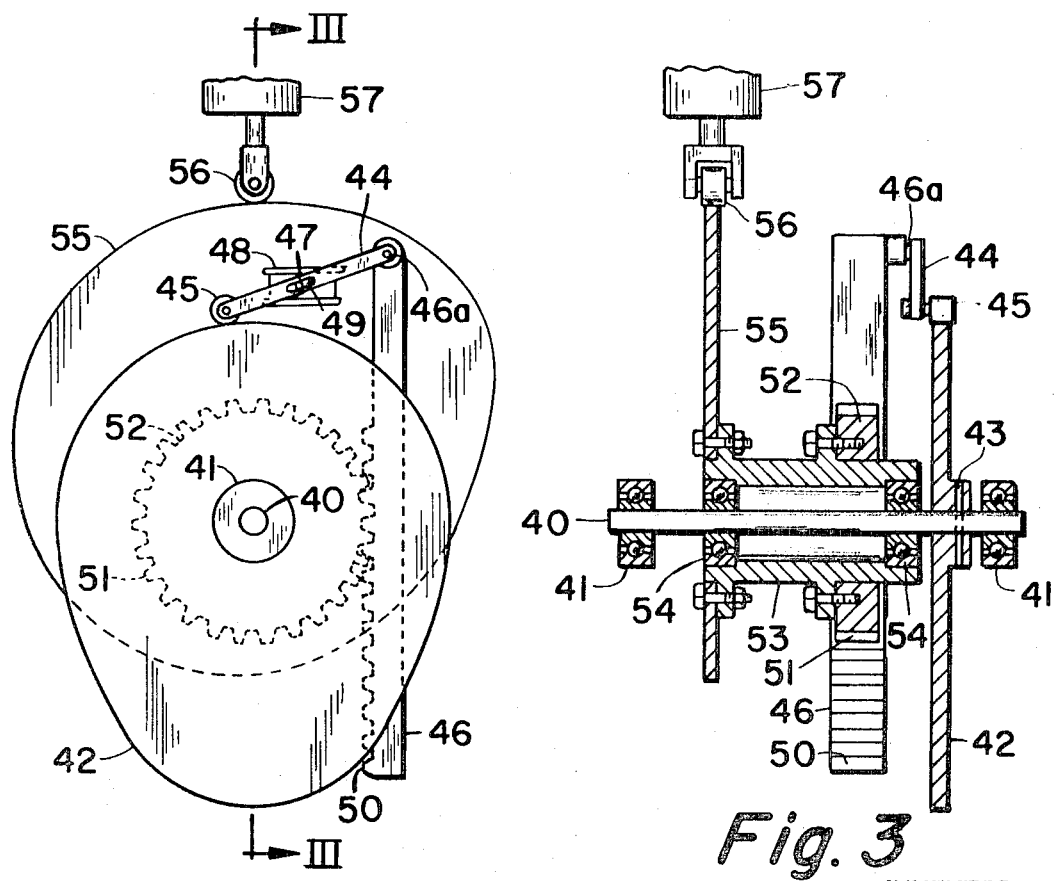
Fig. 2
Fig. 3
INVENTOR.
Stuart M. Dockerty
BY Burton R. Turner
ATTORNEY

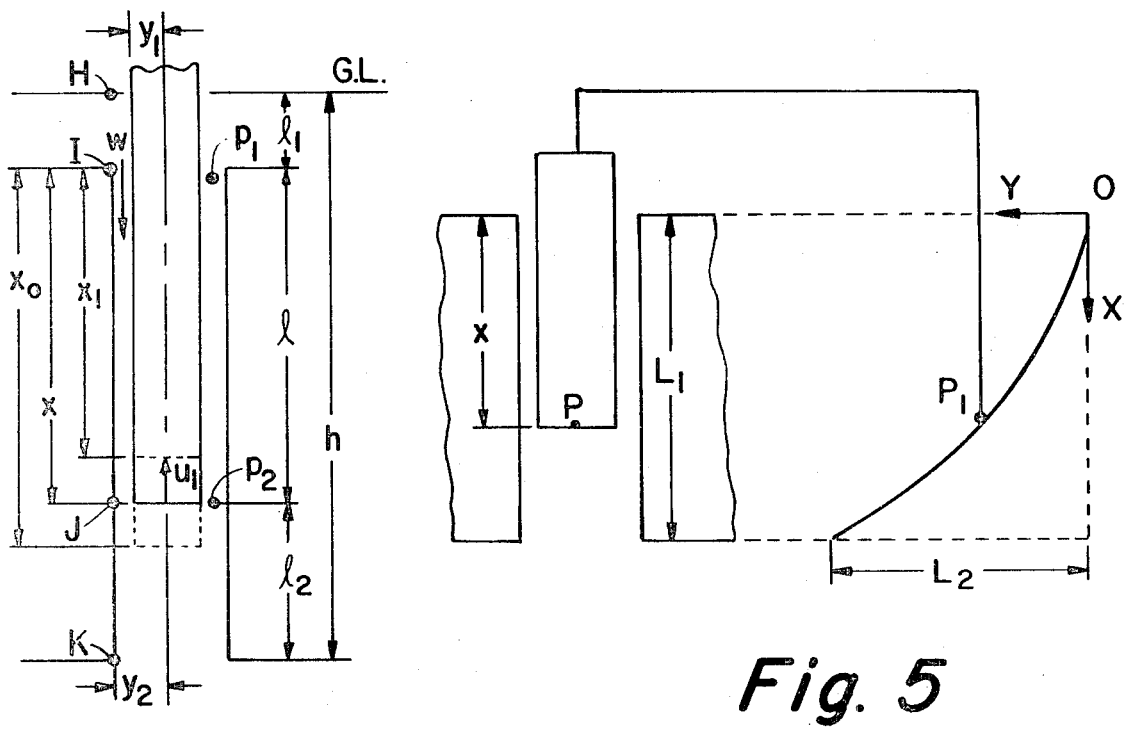
Fig. 4
Fig. 5
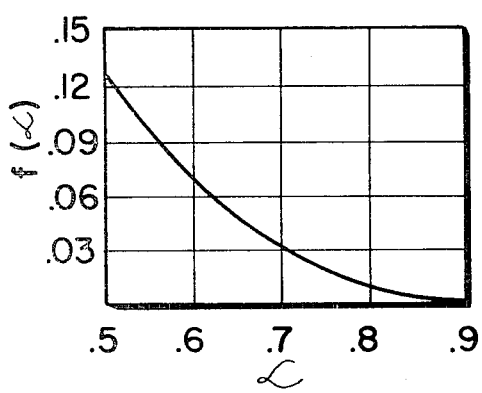
Fig. 6
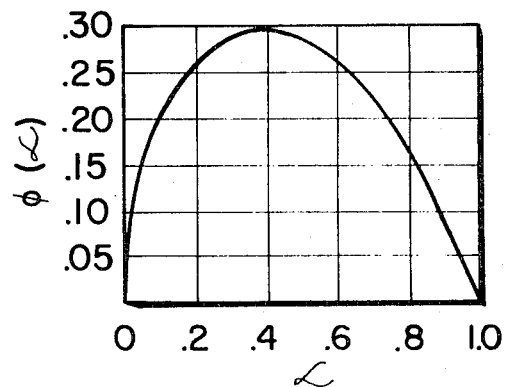
Fig. 7
INVENTOR.
Stuart M. Dockerty
BY
ATTORNEY

METHOD AND APPARATUS FOR FEEDING MOLTEN GLASS

In the past it has been customary to deliver charges of molten glass by utilizing a conventional tapered well with a cylindrical gobbing needle. However, such a system is inherently limited to relatively high-viscosity glasses, and is not capable of maintaining zero flow at the orifice intermediate gobbing cycles with relatively low-viscosity glasses having a viscosity below 10,000 poises.

Further, the conventional tapered well delivery system has not been completely satisfactory due to the lack of adequate control obtainable between the tapered walls of the well and the gobbing needle. That is, the control coupling obtainable between the needle and the walls of the tapered well is limited to a line coupling between the needle and the closest portion of the tapered well while the needle is in its lowermost position. When the needle is raised upwardly the control coupling is virtually nonexistent since the upwardly diverging tapered walls of the well produce a large glass-flow opening between the needle and the well, which precludes a flow-control coupling therebetween. Accordingly, although some degree of control is obtainable with the tapered well configuration when utilizing high-viscosity glasses, it has been found that the tapered well is not suitable for periodically dispensing discrete charges of low-viscosity glass with virtually no flow or suck up at the orifice intermediate the charging cycle.

A further disadvantage encountered with the conventional tapered well, whether utilizing low- or high-viscosity glasses, resides in the fact that it is very difficult to prescribe the required needle velocities in order to obtain zero flow at the orifice when changing gob volume. That is, when the mean position of the needle in the well is raised or lowered to increase or decrease the gob volume respectively, it is necessary to change the rate of needle stroke in order to provide zero flow and prevent suck up at the orifice intermediate the gobbing cycle. The tapered well gobbing system has a further disadvantage in that it is practically impossible to separate gob weight control from suck up control, since by the very nature of the tapered well construction, one influences the other, and as a result, a completely new cam configuration, prescribed by trial and error, was required every time a change in gob volume was made, in order to obtain zero flow at the orifice.

Finally, it has been customary with the conventional tapered well setup to utilize a single continuously rotating cam which not only prescribes the needle velocities but also determines the cycle time, i.e., one revolution equaling one complete cycle. Accordingly, it was impossible to independently vary the cycle time and the needle stroke since they were combined in one unit. In addition, this setup required the changing of the feeder control cam for each ware piece requiring a different gob weight.

The present invention obviates the problems heretofore encountered with the conventional tapered well gobbing system by providing an improved straight well construction having a novel extended uniform control coupling between the needle and the vertical wall surfaces of the straight well. In effect, a cylindrical molten-glass flow-control coupling is provided between the straight well and the cooperatively positioned needle, along the entire extent of the straight well. Due to this simplified geometry it is now possible to mathematically calculate the various correlations between needle strokes, gob weight, and zero flow. In addition a plurality of cams are provided with pivotal linkage therebetween so that the cycle time or gob volume may be independently controlled while the needle speed is automatically correlated to compensate for zero flow at the orifice intermediate the periodic discharge.

It thus has been an object of my invention to improve the control of periodically feeding molten glass downwardly through an orifice.

A further object of my invention has been to extend the range of periodically feeding molten glass charges downwardly through an orifice to low-viscosity glasses below 10,000 poises.

A further object of my invention has been to provide a novel method and apparatus for automatically coordinating changes in gob volume with needle speed in order to give zero flow at the orifice intermediate such charges, while independently controlling the cycle time of such charges.

These and other objects of my invention will become more apparent to those skilled in the art from the following disclosure and accompanying drawings in which:

FIG. 1 is a schematic diagram illustrating the principle of operation of my invention.

FIG. 2 is a schematic illustration of an operating means for actually carrying out the inventive concept.

FIG. 3 is a cross-sectional view taken along line III—III of Fig. 2.

FIGS. 4 and 5 are schematic illustrations of the invention for purposes of explaining the derivation of the equations utilized in arriving at the invention, and for specific examples thereof.

FIGS. 6 and 7 are graphical displays of the function of $\alpha$ for the constants A and B, respectively.

As shown in FIG. 1, my invention includes an elongated tubular well 10 having substantially vertical sidewall portions 11 and an orifice ring 12 secured to the bottom thereof having a discharge opening or orifice 13. A needle member 14 having elongated vertical sidewall portions 15 is shown cooperatively positioned within the well 10 for vertical movement. The cooperation provided between the vertical wall portions 11 of the straight well and the adjacent wall portions 15 of the needle 14 provides a cylindrical uniform molten-glass control coupling between the needle and the well along the full extent of the well. Accordingly, it is not only possible to extend the control range to very low-viscosity glasses, such as below 1,000 poises, but also it is possible to mathematically calculate the correlation between gob weight and the necessary needle position and stroke to provide zero flow at the orifice intermediate discharge cycles.

My investigations have shown that the midposition $\bar{x}$ of the needle stroke is given by the following relation:

$$\bar{x} = (Ah/v \times T/V)$$

wherein $A$ is a function of the radius $r_1$ of the needle 14 and the radius $r_2$ of the well 10; $h$ is the total head of glass acting upon the orifice 13; $v$ is the viscosity of the glass in poises; $T$ is the gobbing cycle time; and $V$ is the total gob volume. It thus can be seen that for a given feeder setup, wherein the radius of the needle and well are fixed, and the glass head and viscosity held constant, the mean needle position $\bar{x}$ is determined by the ratio $T/V$. The constant $A$ is determined from the following relation:

$$A = \frac{\pi d g r_2^4}{8}(1-\alpha^2)^2 \left[\frac{1+\alpha^2}{1-\alpha^2} - \frac{1}{\log e \frac{1}{\alpha}}\right]$$

wherein $d$ is the glass density in grams per cubic centimeter; $g$ is the gravity constants, 980 cm./sec./sec.; and $\alpha = r_1/r_2$.

The length $L$ of the needle stroke, such as shown between the full and broken lines in FIG. 1, is set forth in the following equation:

$$L = \frac{V}{\frac{Ah}{\sqrt{D}} + \pi r_1^2 + B}$$

wherein $D$ is chosen to give the required gob shape on the down stroke of the needle, and $B$ is a constant derived from the following formula:

$$B = \pi r_2^2 \left[\frac{1-\alpha^2}{\log e \frac{1}{\alpha^2}} - \alpha^2\right]$$

The up stroke velocity $u_1$ in centimeters per second is represented by the equation $u_1 = C/X$ wherein $$C = \frac{Ah}{v(\pi r_1^2 + B)}$$

In a like manner, the down stroke velocity $u_2$ of the needle in centimeters per second is represented by the relation $u_2=D/x$ wherein $x$ is equal to the immersion depth of the needle at the particular time.

Referring now to FIGS. 4 and 5, the derivation of the mean needle position $\bar{x}$ and the constants $A$ and $B$ will be readily understood. Initially it is assumed that the flow impedance in the area HI between the glass line GL and the top of the well, and the area JK between the bottom of the needle and the orifice, are negligible compared to the impedance in the annulus area IJ between the needle and the well. The axial velocity of flow in the annular space IJ is derived from the Navier-Stokes equations, given in *Hydrodynamics*, Lamb, 6th Ed., p. 585, as follows:

$$w = -\frac{1}{4\mu}\left(\frac{p_1-p_2}{l}+\sigma g\right)r^2 + A_1 \log_e r + B_1.$$

The various component parts are set forth in c.g.s units, with $w$ = down velocity of glass flow at some radius $r$, $r_1$ = radius of the needle; $r_2$ = radius of the well; $r$ = some radius between $r_1$ and $r_2$; $v$ or = = viscosity in poises; $d$ or $\sigma$ = specific gravity of g./cm.$^3$; $g$ = gravitational constant, 980 dynes/cm.$^2$; and $p_1$ and $p_2$ are the pressures at the ends of the annulus. In addition, $\alpha = r_1/r_2$; $x_0$ = bottom position of the needle; $x_1$ = top position of the needle; $x$ or $l$ = position of the needle at a given time; $L=x_0-x_1$ = = of the stroke; $\bar{x}=\frac{1}{2}(x_1+x_0)$ = mean position of the needle; $u_1$ = upward velocity of the needle; $u_2$ = downward velocity of the needle; $Q_1$ = volume rate of glass flow through the annulus on upstroke; $Q_2$ = volume rate of glass flow through the annulus on downstroke of the needle; $h$ = total glass head; $l_1$ = head of glass above needle; and $l_2$ = head of glass in the well below the needle.

In the Navier-Stokes equations the constants $A_1$ and $B_1$ are determined by the boundary conditions of flow in the annulus, i.e., $w=0$ for $r=r_2$ and $w=-u_1$ for $r=r_1$. The term $\sigma g$ is included because the tube is vertical. Also, $p_1=\sigma g l_1$ and $p_2=-\sigma g l_2$. Since the pressure at K is substantially zero, the pressure at J will be negative. By collecting and substituting terms we find that $$\frac{p_1-p_2}{l}+\sigma g = \sigma g\left[\frac{l_1+l_2}{l}+1\right] = \sigma g\left[\frac{l_1+l_2+l}{l}\right] = \frac{\sigma g h}{l} = \frac{dgh}{x}$$

again, using the Navier-Stokes formula with the substituted terms the formula becomes:

$$w = \frac{dgh}{4vx} r^2 + A_1 \log_e r + B_1$$

By substituting the conditions $w=0$ for $r=r_2$ and $w=-u_1$ for $r=r_1$, the above formula becomes as follows:

$$w = \frac{dgh}{4vx}\left[r_2^2 - r^2 - (r_2^2-r_1^2)\frac{\log_e \frac{r}{r_2}}{\log_e \frac{r_1}{r_2}}\right] - u_1 \frac{\log_e \frac{r}{r_2}}{\log_e \frac{r_1}{r_2}}$$

The rate of flow downwardly through the annulus is expressed by the following formula:

$$Q_1 = \int_{r_1}^{r_2} 2\pi r w\, dr = 2\pi \int_{\alpha r_2}^{r_2} r w\, dr$$

By substituting the above value for $w$ and putting $r_1 = \alpha r_2$, and integrating, one obtains the following value for $Q_1$:

$$Q_1 = \frac{\pi dghr_2^4}{8vx}(1-\alpha^2)^2\left[\frac{1+\alpha^2}{1-\alpha^2} - \frac{1}{\log_e \frac{1}{\alpha}}\right] - \pi r_2^2 u_1\left[\frac{1-\alpha^2}{\log_e \frac{1}{\alpha^2}} - \alpha^2\right]$$

Changing the direction of the needle motion, changes the sign before the term $\pi r_2^2 u_1$ from minus to plus, and accordingly $Q_2$ is represented by the same formula with the sign so changed.

We are able to shorten the formula by setting $$A = \frac{\pi dgr_2^4}{8}(1-\alpha^2)^2\left[\frac{1+\alpha^2}{1-\alpha^2} - \frac{1}{\log_e \frac{1}{\alpha}}\right]$$

and by setting $$B = \pi r_2^2\left[\frac{1-\alpha^2}{\log_e \frac{1}{\alpha^2}} - \alpha^2\right]$$

Therefore, the formula for the rate of glass flow through the annulus on the upstroke becomes $Q_1=(Ah)/vx)-Bu_1$, whereas the formula for the rate of glass flow through the annulus on the downstroke of the needle becomes $Q_2=(Ah)/vx)+Bu_2$.

In these equations the constants $A$ and $B$ depend only on the geometry of the needle and well. On the upstroke, if the well is to be kept just full, $Q_1$ must equal the rate of needle displacement. Hence:

$$Q_1 = \frac{Ah}{vx} - Bu_1 = \pi r_1^2 u_1$$

and therefore $$u_1 = \frac{Ah}{vx(\pi r_1^2+B)} = \frac{C}{x}$$

where $$C = \frac{Ah}{v(\pi r_1^2+B)}$$

The time $t_1$ for the upstroke from $x_0$ to $x_1$ is found as follows:

$$u_1 = -\frac{dx}{dt} = \frac{C}{x}$$

$$\int_{x_0}^{x_1} x\,dx = -C\int_0^{t_1} dt$$

$$\tfrac{1}{2}(x_0^2 - x_1^2) = Ct_1$$

$$\tfrac{1}{2}(x_0+x_1)(x_0-x_1) = Ct_1$$

$$t_1 = \frac{\bar{x}L}{C}$$

As shown above, the upstroke of the needle is specified so as to keep the well just filled. On the downstroke, however, there is much more leeway. In general the speed will be considerably higher than on the upstroke. Using the same cam contour but with a higher speed in the linear drive it will be of the form $u_2=D/x$ where $D$ is set to give a desired gob length.

As in the above case the time $t_2$ for the downstroke is: $t_2 = \bar{x}L/D$. The total cycle time $$T = t_1 + t_2 = L\bar{x}\left(\frac{1}{C}+\frac{1}{D}\right)$$

and therefore:

$$T = \frac{L\bar{x}v}{Ah}\left[\pi r_1^2 + B + \frac{Ah}{vD}\right]$$

On the downstroke the rate at which glass flows by the needle into the well is set forth as follows $$\frac{dq}{dt} = Q_2 = \frac{Ah}{vx} + Bu_2$$

however, $$\frac{dq}{dt} = \frac{dq}{dx}\frac{dx}{dt} = \frac{dq}{dx}u_2$$

and therefore $$\frac{dq}{dx} = \frac{Ah}{vxu_2} + B$$

However, since $$u_2 = \frac{D}{x}$$

then $$\frac{dq}{dx} = \frac{Ah}{vD} + B$$

The total flow $Q_D$ into the well during the downstroke is as follows:

$$Q_D = \int_{x_1}^{x_0} \left(\frac{Ah}{vD} + B\right) dx = \left(\frac{Ah}{vD} + B\right) L$$

The total flow out through the orifice per cycle or the gob volume V is:

$$V = \pi r_1^2 L + Q_D = \left(\pi r_1^2 + B + \frac{Ah}{vD}\right) L$$

giving $$L = \frac{V}{\pi r_1^2 + B + \frac{Ah}{vD}}$$

Substituting in the time equation, $$T = \frac{L\bar{x}v}{Ah} \left[\pi r_1^2 + B + \frac{Ah}{vD}\right]$$

and transposing, we arrive at:

$$\bar{x} = \frac{Ah}{v} \cdot \frac{T}{V}$$

Referring now to FIG. 5, the relationship between the parabolic cam surface and the needle can be readily understood. Assume for the sake of clarity that the cam follower $P_1$ is on the same horizontal plane as the needle bottom P, and that the maximum needle movement $L_1$ is obtained by a horizontal movement $L_2$ of the cam. It will be seen that if the cam is moved to the left at a constant speed $u_o$, the needle will move upwardly with a speed $C/x$, provided the cam is of a parabolic shape given by the formula $x^2 = (L_1^2)/(L_2)y$, which fits the end points $y=0$, $x=0$ and $y=L_2$, $x=L_1$. Taking the time derivative of this equation we obtain the following:

$$2x \frac{dx}{dt} = \frac{L_1^2}{L_2} \cdot \frac{dy}{dt}$$

However, $$\frac{dx}{dt} = u_1$$

which equals the up speed of the needle, whereas $$\frac{dy}{dt} = u_0$$

which equals the horizontal speed of the cam, thereby giving the following formula:

$$u_1 = \frac{L_1^2}{2L_2} \cdot \frac{u_0}{x} = \frac{C}{x}$$

wherein $$C = \frac{L_1^2 u_0}{2L_2}$$

With this cam the required velocity $U^0$ is:

$$u_0 = \frac{2L_2}{L_1^2} C$$

wherein $$C = \frac{Ah}{v(\pi r_1^2 + B)}$$

as previously determined. A similar analysis for the downstroke gives:

$$u_B = \frac{2L_2}{L_1^2} D$$

The ratio $C/D$ is fixed by the design of the rotary driving cam, and hence the ratio of the left velocity $U_o$ and the right velocity $U_B$ is fixed. The magnitude of $U_o$ is adjusted by the linkage shown in FIG. 1. In the case of an adjustment for a viscosity change, for an example, let the viscosities be $v_1$ and $v_2$. It is also required that the cycle time $T$, and the gob volume $V$ be the same for both viscosities. Since $$C = \frac{Ah}{v(\pi r_1^2 + B)} = \frac{\text{constant}}{v}, \text{ and } \frac{C}{D} \text{ is constant,}$$

and if $C_1$, $D_1$ are the values for $v_1$ and $C_2$, $D_2$ are the values for $v_2$, then $C_1 v_1 = C_2 v_2 =$ constant and $D_1 v_1 = D_2 v_2 =$ constant. From the equation $\bar{x} = (Ah/v) \cdot (T/V)$ we find $\bar{x}_1 v_1 = \bar{x}_2 v_2 = Ah(T/V$ constant. The value of $\bar{x}$ must hence be changed for a change in viscosity according to this relation in the equation $$L = \frac{V}{\pi r^2 + B + \frac{Ah}{vP}}$$

Since $Dv$ is constant, the length of needle stroke will be the same in both cases. From the equation $\bar{x}_1 v_1 = \bar{x}_2 v_2 = Ah(T/V)$, with the value of $C$ inserted; the upstroke time $t_1$ is:

$$t_1 = \frac{\bar{x}vL(\pi r^2 + B)}{Ah}$$

Since $(\bar{x}v)$ and $L$ are the same in the case of both viscosities, the value of the upstroke time will be unchanged. The same is true for the downstroke time. Therefore the specification $\bar{x}_1 v_1 = \bar{x}_2 v_2$ or $\bar{x}_2/\bar{x}_1 = v_1/v_2$ will result in identical cycle times.

A second adjustment must be made as seen from the $u_o$ and $u_B$ equations. Since $C$ and $D$ are both proportional to $1/v$, and since the horizontal left and right velocities are proportional to $C$ and $D$ respectively: $u_o$ is proportional to $1/v$ and $u_B$ is proportional to $1/v$. Therefore, $u_o v =$ constant for both cases and $u_B v =$ constant for both cases, or $(u_o)_2/(u_o)_1 = v_1/v_2$ and similarly $(u_B)_2/(u_B)_1 = v_1/v_2$. The horizontal velocity of the cam must thus be changed in the same ratio as the $\bar{x}$'s. This is done by changing the ratio of the linkage between the linear rotary cam and the parabolic cam, thereby maintaining zero flow at the orifice between charges.

With the combination of an adjustable speed two-section linear cam, an adjustable linkage, and a second cam of specified parabolic shape, one can specify and obtain settings not only for pieces per minute but also charge weight. This can be accomplished for a wide range of viscosity such as from 100 to 10,000 poises. The same cams are used for all conditions and the only adjustments are: rotary speed of driving cam, adjustment of mean needle position $\bar{x}$, and adjustment through linkage of the in and out (ratio fixed) velocity of the parabolic cam.

Referring again to FIG. 1, it can be seen how the above principles are applied to the operation of the invention. A constant velocity rise and fall cam 20 is rotated at a constant speed to provide the desired cycle time. An adjustably pivoted multiplier arm 21 has a cam follower 22 at one end in constant rolling engagement with the cam 20. The multiplier arm 21 is pivoted about an adjustable pivot support 23 which is linearly adjusted along screw shaft 24 such as by means of a crank 25. The opposite end of the multiplier arm 21 is provided with suitable linkage 26 for oscillating a cam 27 having a needle-actuating cam surface 28. A needle-actuating cam follower 29, having suitable connecting linkage 30 for operating needle 14, rides upon cam surface 28. When the cam 27 is provided with a parabolic curved surface 28 such that $y=ax^2+b$, and the cam 27 is moved in the $y$ direction with constant upstroke speed and downstroke speed, the point P, of contact of cam follower 29 is constrained to move on the $x$ axis, and represents needle motion.

Referring now to FIGS. 2 and 3, which schematically illustrate a practical means for carrying out the invention, a shaft 40 is shown journaled for rotation in a pair of bearing supports 41. The shaft 40 is driven at a constant speed by any suitable means such as a timing drum. A constant velocity cam 42 is secured to the shaft 40 for rotation therewith, such as by a key or pin 43. A pivotally adjustable multiplier arm 44 has a cam follower 45 on one end in constant contact with cam 42. A rack member 46 is suitably connected at 46a to the opposite end of multiplier arm 44 for substantially linear oscillating movement in response to the pivotal movement of arm 44. The multiplier arm 44 is adjustably supported about a pivot 47 and along a track 48 which extends substantially perpendicular to the linear movement of arm 44. A slot 49 is provided in the arm 44 so as to facilitate adjustment of the pivot support 47 along the track 48.

Rack member 46 is provided with a plurality of teeth 50 which cooperably engage teeth 51 of a pinion 52. The pinion 52 is free to oscillate back and forth about shaft 40 by means of a sleeve 53 freely rotatable about shaft 40 by bearings 54. A parabolic cam 55 is rigidly secured to the sleeve 53 for oscillating motion therewith, in response to the motion imparted to the sleeve by the pinion 52. Both the pinion and the parabolic cam may be secured to the sleeve in any suitable manner such as a key or pin member. A cam follower 56, connected to any suitable mechanism such as hydraulic servo valve 57 for operating the needle 14, rides upon the parabolic surface of cam 55.

In operation, the shaft 40 is rotated at a desired rate so that the constant velocity cam 42 provides a desired cycle time. The cam follower 45, rides upon the cam 42 to pivot multiplier arm 44 about its pivotal support 47. As a result the rack member 46 periodically oscillates pinion 52 back and forth through a predetermined arc. Pinion 52 in turn oscillates the parabolic cam 55 back and forth through a predetermined arc to periodically energize hydraulic servo valve mechanism 57 through cam follower 56 to raise and lower needle 14 in predetermined time relation to provide a desired gob weight with no flow at the orifice intermediate the discharge cycle.

When it is desired to change the gob volume, pivot support 47 of multiplier arm 44 is adjusted along track 48 which causes rack member 46 to pivot pinion 52 and accordingly cam 55 so as to present a different arcuate portion of the cam surface to the cam follower 56. By applying the foregoing formulas it is possible to mathematically calculate the cam surface so as to program and coordinate gob volume and needle stroke rate so as to achieve a desired zero flow rate at the orifice intermediate the gobbing cycle. Further, with the independently rotated cams 42 and 55, it is possible to change gob weight, automatically compensating for the necessary change in needle stroke to provide zero flow at the orifice, without changing cycle time.

The following is a specific example of the operation of a low-viscosity feeder embodying the present invention, which is by no means limiting in nature. The example includes a 4 pound gob weight with a density $d=2.4$ g./cm.$^3$ at eight cuts per minute, of a glass having a viscosity $v=500$ poises. The radius of the needle $r_1=4$ cm. and the radius of the well $r_2=5.33$ cm., and therefore $\alpha=r_1/r_2=0.75$.

For the constant A, $$f(\alpha)=(1-\alpha^2)^2\left[\frac{1+\alpha^2}{1-\alpha^2}-\frac{1}{\log_e\frac{1}{\alpha}}\right]=.01827,$$

as seen from Fig. 6. For the constant B, $$\phi(\alpha)=\frac{L-\alpha^2}{\log_e\frac{1}{\alpha^2}}-\alpha^2=.1979,$$

as seen from Figure 7.

$$Gob \text{ volume } V=\frac{4\times 454}{2.4}=757 \text{ cm.}^3$$

Cycle time $T=60/8=7.5$ sec. The glass head $h=50$ cm.

$$A=\frac{\pi d g r_2^4}{8}f(\alpha)=\frac{\pi\times 2.4\times 980\times(5.333)^4\times.01827}{8}=13650$$

$$B=\pi r_2^2\phi(\alpha)=\pi\times(5.333)^2\times.1979=17.68$$

$$C=\frac{Ah}{v(\pi r_1^2+B)}=\frac{13650\times 50}{500(\pi\times 4^2+17.68)}=20.09$$

$D$ is chosen at approximately 10 times $C=200$. That is, the down velocity equals 10 times the up velocity $$X=\frac{Ah}{v}\frac{T}{V}=\frac{13650\times 50\times 7.5}{500\times 757}=13.52 \text{ cm.}$$

$$T=L\bar{X}\left[\frac{1}{C}+\frac{1}{D}\right] \text{ or } 7.5=L\times 13.52\left[\frac{1}{20.09}+\frac{1}{200}\right]$$

Therefore $L=10.13$ cm.

Referring to FIG. 4, $x_0=13.52+(10.13)/(2)=18.565$ cm. (bottom of stroke). $x_1=13.52-(10.13)/(2)=8.455$ cm (top of stroke). The gob is about 8 cm. diameter and 15 cm. length. Orifice diameter is about 8 cm. or slightly smaller. Since orifice changes are quite simple the optimum diameter may be applied as desired. Referring now to FIG. 5, the cam design depends on the relation between the length of the well $L_1$ and the total head $h$. With $h=50$ cm., in this case $L_1=30$ cm. The equation for the cam shape is $x^2=(L_1^2)/(L_2)y$. The value of $L_2$ can have any value compatible with smooth cam action. For example, $L_2=L_1=30$ cm. This gives $x^2=(30^2)/(30)y=30y$. The horizontal speed $u_o$ for the upstroke is given by $C=(L_1^2)/(2L_2)u_o$ or $20.09=15u_o$. Therefore $u_o=1.34$ cm./sec. Similarly, $u_B=13.4$ cm./sec. for the downstroke.

If for example the speed of the downstroke is doubled, i.e., $D=400$, with the other factors $A$, $B$, $C$, $V$, and $v$ unchanged, then $\bar{x}=13.52$ cm. as before.

$$T=L\bar{x}\left[\frac{1}{C}+\frac{1}{D}\right]$$

or $$7.5=L\times 13.52\left[\frac{1}{20.09}+\frac{1}{400}\right],$$

giving $L=10.61$ cm.

The only change is an increase in $u_B$ from 13.4 to 26.8 cm. per sec. and an increase in needle stroke from 10.13 to 10.61 cm.

If the pieces per minute is increased for a smaller gob volume, so that the pounds per minute is maintained, $T/V$ remains constant as do $A$, $B$, and $C$. $\bar{x}$ will hence be unchanged and $L$ will be proportional to the cycle time $T$. As the viscosity of the glass is changed, $A$, and $B$ will remain constant, but the value of $C$ will vary inversely as the viscosity. The length of the needle stroke will remain roughly constant at about 10 cm. That is, when $D=10C$, $T=L\bar{x}(1.1/C)$ or $7.5=10\bar{x}(1.1/C)$ with $\bar{x}$ being approximately $0.7C$.

Although I have disclosed the now preferred embodiments of my invention it will be apparent to those skilled in the art that various changes and modifications may be made thereto without departing from the spirit and scope thereof as defined in the appended claims.

I claim:

1. Apparatus for controlling the feeding of low-viscosity glass so as to periodically deliver a desired volume of molten glass downwardly through an orifice at predetermined intervals which comprises, an elongated tubular well extending below the glass level of a feeder and having substantially vertical sidewall portions, an orifice ring having an orifice opening formed therein secured to the lower end of said sidewall portions, a needle member having elongated vertical sidewall portions positioned within said well for vertical movement therewithin, said elongated sidewall portions of said needle forming an extended molten glass control coupling with the sidewall portions of said elongated tubular well so as to control the feeding of low-viscosity glass through the orifice, cam follower means operatively connected to said needle member, cam means having a prescribed parabolic cam surface for imparting vertical movement through said cam follower means to said needle member to alternately feed a desired charge volume from said orifice and maintain zero flow at said orifice between said charges, and adjustment means for presenting a defined portion of said cam follower to said cam follower means to time and a zero flow condition at the orifice intermediate the charges.

2. Apparatus as defined in claim 1 wherein said cam means for imparting vertical movement of desired stroke and rate to said needle member includes a constantly rotated timing cam and a needle-actuating movable cam surface, and said adjustment means includes pivotal connecting linkage between said timing cam and cam surface for imparting cyclic movement to said cam surface in response to said constantly rotating timing cam.

3. Apparatus as defined in claim 2 wherein said pivotal connecting linkage is provided with an adjustable pivot support to adjust the presentation of said needle-actuating cam surface to suit cam follower surface to said cam and thereby control the volume delivered by the orifice without affecting cycle time or zero flow at the orifice.

4. Apparatus as defined in claim 1 wherein the mean position $\bar{x}$ of the needle member within the tubular well for a desired gob volume and cycle time may be mathematically calculated from the following equation: $\bar{x}=(Ah)/(v) \times T/V$ wherein $A$ is a constant for a well of given radius having a needle of given radius; $h$ is the total glass head acting upon the delivery orifice of the well; $v$ is the viscosity of the glass in poises; $T$ is the gobbing cycle time; and $V$ is the total gob volume.

5. Apparatus for controlling the feeding of low-viscosity glass so as to periodically deliver a desired volume of molten glass downwardly through an orifice at predetermined intervals which comprises, an elongated tubular well extending below the glass level of a feeder and having substantially vertical sidewall portions, an orifice ring having an orifice opening formed therein secured to the lower end of said sidewall portions, a needle member having elongated vertical sidewall portions positioned within said well for vertical movement therewithin, said elongated sidewall portions of said needle forming an extended molten glass control coupling with the sidewall portions of said elongated tubular well so as to control the feeding of low-viscosity glass through the orifice, means having a prescribed parabolic cam surface for imparting vertical movement to said needle member to alternately feed a desired charge volume from said orifice and maintain zero flow at said orifice between said charges, adjustment means for presenting a defined portion of said cam surface to a cam follower to vary the volume of the charge while maintaining constant cycle time and a zero flow condition at the orifice intermediate the charges, said cam means including a first cam and a second cam, said first cam being rotatable at a constant velocity proportional to the desired cycle time; said adjustment means including a pivotal arm provided with a roller follower at one end to follow said first cam, a rack member secured to the opposite end of said pivotal arm, and a pinion operatively engaging said rack member; and said second cam, rotatable in response to said pinion, engaging said cam follower to actuate the vertical movement of said needle member within said elongate tubular well.

6. Apparatus as defined in claim 5 wherein said pivotal arm is provided with an adjustable pivot support to change the mean position of the needle in the well so as to change gob volume while simultaneously compensating for stroke length and rate in order to obtain zero flow at the orifice between charging cycles.

7. An improved method of periodically charging low-viscosity glass downwardly through an orifice from a well having a control needle positioned therein which comprises, forming an elongated uniform molten-glass control coupling within the well, alternately discharging a desired charge volume from said well and maintaining a zero flow at the orifice thereof through operation of said glass control coupling, changing the volume of the charge discharged by simultaneously changing the operative length of the glass control coupling and its effective rate through a coordinated adjustment of the needle stroke while maintaining the cycle time constant and maintaining zero flow at the orifice between charging cycles, and controlling the cycle time independently of the coordinated needle stroke so that the discharge cycle may be changed while maintaining a desired discharge volume and zero flow at the orifice between charges.

* * * * *

UNITED STATES PATENT OFFICE
CERTIFICATE OF CORRECTION

Patent No. 3,620,705   Dated November 16, 1971

Inventor(s) Stuart M. Dockerty

It is certified that error appears in the above-identified patent and that said Letters Patent are hereby corrected as shown below:

In the Abstract, line 4, "positioned with a tubular well" should read --positioned within a tubular well--; Column 3, line 22, "v or = = viscosity" should read --v or $\mu$ = viscosity--; Column 3, line 23, "gravity of g./cm.$^3$;" should read --gravity in gms/cm.$^3$;--; Column 3, line 27, "L = $x_0$ - $x_1$ = = of" should read --L = $x_0$ - $x_1$ = length of--; Column 6, lines 35-38, "L = $\dfrac{V}{\pi r^2 + B + \dfrac{Ah}{vP}}$" should read --L = $\dfrac{V}{\pi r^2 + B + \dfrac{Ah}{vD}}$--; Column 9, line 21, "means to time and a" should read --means to vary the volume of the charge while maintaining constant cycle time and a--; Column 9, line 34, "suit cam follower surface to said cam and thereby control" should read --said cam follower means and thereby control--

Signed and sealed this 13th day of June 1972.

(SEAL)
Attest:

EDWARD M. FLETCHER, JR.
Attesting Officer

ROBERT GOTTSCHALK
Commissioner of Patents